(12) United States Patent
Shetty et al.

(10) Patent No.: US 10,089,292 B2
(45) Date of Patent: Oct. 2, 2018

(54) CATEGORIZATION OF FORMS TO AID IN FORM COMPLETION

(71) Applicant: Adobe Systems Incorporated, San Jose, CA (US)

(72) Inventors: Shipali Shetty, San Jose, CA (US); Shawn A. Gaither, Raleigh, NC (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/852,224

(22) Filed: Sep. 11, 2015

(65) Prior Publication Data

US 2017/0075873 A1    Mar. 16, 2017

(51) Int. Cl.
| | |
|---|---|
| *G06F 17/00* | (2006.01) |
| *G06F 17/24* | (2006.01) |
| *G06F 3/0481* | (2013.01) |
| *G06F 17/30* | (2006.01) |
| *G06Q 10/10* | (2012.01) |

(52) U.S. Cl.
CPC .......... *G06F 17/243* (2013.01); *G06F 3/0481* (2013.01); *G06F 17/3053* (2013.01); *G06F 17/30707* (2013.01); *G06F 17/30864* (2013.01); *G06F 17/30867* (2013.01); *G06Q 10/10* (2013.01)

(58) Field of Classification Search
CPC ......... G06F 17/30864; G06F 17/30705; G06F 17/30707; G06F 17/30867; G06F 17/3071; G06F 17/243; G06F 17/3053; G06F 3/0481; G06Q 10/10; G06N 99/005

USPC .................................................. 715/221–225
See application file for complete search history.

(56) References Cited

U.S. PATENT DOCUMENTS

| | | | | |
|---|---|---|---|---|
| 2005/0160065 | A1* | 7/2005 | Seeman | G06F 17/30867 |
| 2005/0209903 | A1* | 9/2005 | Hunter | G06Q 10/06316 |
| | | | | 705/7.26 |
| 2013/0238966 | A1* | 9/2013 | Barrus | G06K 9/00449 |
| | | | | 715/223 |
| 2014/0006917 | A1* | 1/2014 | Saund | G06K 9/00449 |
| | | | | 715/222 |
| 2014/0279573 | A1* | 9/2014 | Coats | G06Q 30/0278 |
| | | | | 705/306 |

\* cited by examiner

*Primary Examiner* — Quoc A Tran
(74) *Attorney, Agent, or Firm* — Kilpatrick Townsend & Stockton LLP (57) ABSTRACT

Systems and methods disclosed herein facilitate adding content to forms by providing field content suggestions using context determined based on form features. This involves providing a user interface for display, the user interface displaying a form and providing editing features usable to add content to fields of the form. The systems and method further involve categorizing the form or portion of the form into a context based on form features for non-text field characteristics or field-specific text characteristics of the form or portion of the form. A form field suggestion for a field is identified based on the context of the form or portion of the form containing the field and the field content suggestion for the field is provided for display in the user interface.

19 Claims, 6 Drawing Sheets

302
Provide a user interface for display, the user interface displaying a form and providing editing features usable to add content to fields of the form

↓

304
Categorize the form or portion of the form into a context based on form features for non-text field characteristics or field-specific text characteristics of the form or portion of the form

↓

306
Identify a form field suggestion for a field based on the context of the form or portion of the form containing the field

↓

308
Provide the field content suggestion for the field for display in the user interface

CATEGORIZATION OF FORMS TO AID IN FORM COMPLETION

TECHNICAL FIELD

This disclosure relates generally to computer-implemented methods and systems and more particularly relates to improving the efficiency and effectiveness of computing systems used in processing and completing forms.

BACKGROUND

Filling out forms can be a time consuming and frustrating process. Providing automatic suggestions for form field content can simplify the process. For example, an existing form filling application detects that a user's cursor is within a "first name" field and provides selectable options for content for that field based on prior responses to "first name" fields from other previously-completed forms. The user can select one of the options to automatically use the content of a prior response without having to retype that content. For example, the user may be presented with suggestions of his own first name and his own nickname and select his own first name from these options with a mouse click to automatically insert that content and thus avoid having to retype his first name in that field. Alternatively, the user may be presented with his own first name already filled in automatically. Unfortunately such field content suggestions are often over-inclusive or inaccurate, and therefore fail to simplify the process for the person filling out the form.

SUMMARY

Systems and methods disclosed herein facilitate adding content to forms by providing field content suggestions using context determined based on form features. This involves providing a user interface for display, the user interface displaying a form and providing editing features usable to add content to fields of the form. The systems and methods further involve categorizing the form or a portion of the form into a context based on form features for non-text field characteristics or field-specific text characteristics of the form or portion of the form. A form field suggestion for a field is identified based on the context of the form or portion of the form containing the field and the field content suggestion for the field is provided for display in the user interface.

Another embodiment facilitates field content suggestions by associating forms with categories using a training model. This involves creating a training model using form features for non-text field characteristics or field-specific text characteristics of forms in a collection of forms. It further involves automatically categorizing forms or portions of forms with respective contexts based on the form features and using the training model. The forms or portions of the forms and respective contexts are stored at an electronic form server and field content suggestions for fields of the forms are provided based on the respective context of the forms.

These illustrative embodiments and features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

As discussed above, field content suggestions are often over-inclusive or inaccurate, and therefore fail to simplify the process for the person filling out a form. The invention provides better field content suggestions by determining context of forms or portion of forms using form-specific features. Using form-specific features to categorize forms or portions of forms into different contexts greatly improves the accuracy of identifying suggestions for form field content. For example, by identifying that a first name field is in a "child information" context, the field content suggestions can include only the names of the child or children of the person filling out the form, but can exclude other names, such as the person's own name, his spouse's name, his pet's name, his doctor's name, etc., used in other previously-completed forms or portions of forms.

The invention automatically categorizes forms or portions of forms into contexts using form-specific features for non-text field characteristics (e.g., field spacing) or field-specific text characteristics (that a form has a field with field label text "Child's Name") as an alternative to, or in addition to, using the words in the form. Using form features for non-text field characteristics or field-specific text characteristics in categorizing forms into contexts greatly improves the accuracy over using words alone. The accurate categories can then be used to identify and provide field content suggestions.

In one embodiment, forms or portions of forms are categorized into different contexts from a pre-defined set of contexts (e.g., self, spouse, child, parent, etc.). Once the forms are categorized, each form is tagged with one or more best matching contexts. When a form is being completed, the form is associated with context-specific field content suggestions based on the best matching context of the form or portion of the form and the identity of the user completing the form. These suggestions are provided when the form is being completed by the person, for example, when the person clicks on a particular field to be completed, the suggestions are shown as selectable options.

In one embodiment, automatic form categorization uses a machine learning algorithm. A training set of a collection of user forms is used to create a training model and each form is represented in terms of a feature vector for categorization using the training model. The feature vectors for the forms are generated with features based on non-text field characteristics (e.g., the number of fields, the types of fields, the locations of fields, etc.) or field-specific text characteristics (e.g., the field label text, font, or orientation associated with a particular field, etc.) in addition to, or as an alternative to, features based on plain document text. In one embodiment, the feature set includes one or more of these form specific features in addition to text-based features.

Once the training model is created it is used to categorize uncategorized forms into contexts. The system identifies features of a new uncategorized form and then uses the training model to determine that the form should be categorized, for example, in a "self" context. Thus the training model receives as input features of a form, or portion of a form, and identifies, based on the features, an appropriate context or contexts. In developing the training model, the system identifies features (field spacing, section labeling, etc.) in forms, or portions of forms, already identified as "self." The new form or portion of the new form, because it also has some of these same features, is categorized based on the training model in the "self" context.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the phrase "form" refers to a paper or electronic document that is structured for completion by someone filling out the document with information that is expected to be put at specific places on the document. Typically, a form includes a template of fields and additional information added by one or more persons completing the form. A form will generally provide a way for the persons entering information to enter information in a consistent way so that a receiver of multiple instances of the completed form can read or extract information at particular locations on the form and understand, based on the location, the information. Similarly, the use of fields at particular locations on forms facilitates the automatic interpretation of information entered onto the forms. A form may, for example, have a name field and a recipient or analysis application may understand based on the location of the text added to the form by a person completing the form that the added text is the name of the person. The template of a form can specify fields and field characteristics.

As used herein, the phrase "field" refers to a location in a form or a portion of a form at which one or more items of information are entered when the form is completed. Text boxes, Boolean graphics such as checkboxes, and signatures are examples of fields. A field has one or more field characteristics. Fields can be defined explicitly and identified expressly, for example, using metadata in the form. Fields that are not defined can be inferred, for example, using a recognition algorithm that uses appearance of certain graphical objects (lines, rectangles, circle, radio buttons, checkboxes, etc.) to identify locations as candidate fields where information is to be entered when the form is completed.

As used herein the phrase "field characteristic" refers to aspects of a field that identify where the field is located, what information the field should contain, what type of data should be input into the field, etc. Examples of field characteristics include, but are not limited to, field location, field boundary, field label, field input type, field information type, etc. A field boundary is an invisible or visual representation of the bounds of the field. A field input type defines what type of user input changes the information entered into the field (e.g., text entry, drop down choices, check box, radio button, Boolean input, image, etc.). A field information type identifies the subject matter of the field (e.g., "first name" field, "address" field, "YIN" field, etc.). The characteristics of a field may be manually, semi-automatically, or automatically detected on a form. Characteristics of each field may be stored as metadata as part of a form and/or separate from a form.

As used herein the phrase "non-text field characteristics" of a form refers to non-textual aspects of one or more fields including, but not limited to, the number and types of fields in the form, the locations of fields, the boundary dimensions of fields, the information types of fields, the font size and type (e.g., italic, bold, underline, etc.) of labels and field text, the distributions of field labels, the field decorations, the field input types, the spacing or separator type between a label and a field, the separator lines and whitespace between conceptual sections, etc.

As used herein the phrase "field-specific text characteristic" of a form refers to a characteristic of a form having a field that specifies a particular label text, hint text, text font, text spacing, or text orientation. An example field-specific text characteristic is that a form has a field with field label text "Full Legal Name." The field-specific text characteristic is that the form has a field that has a property (i.e., its label text) having a particular value. The text of the label without the association to the field is not a field-specific text characteristic. Thus, raw text appearing in a form that is not associated with a field is not a field-specific text characteristic. Field-specific text characteristics can be identified directly or inferred. In cases of structured forms, field-specific text characteristics can be identified using metadata that specifies the hint shown to users or the name given to the field in a form that defines the form's structure. In cases of unstructured forms in which form field recognition is employed, field-specific text characteristics can be inferred, for example, by identifying label text associated with each field candidate.

Figure 4:
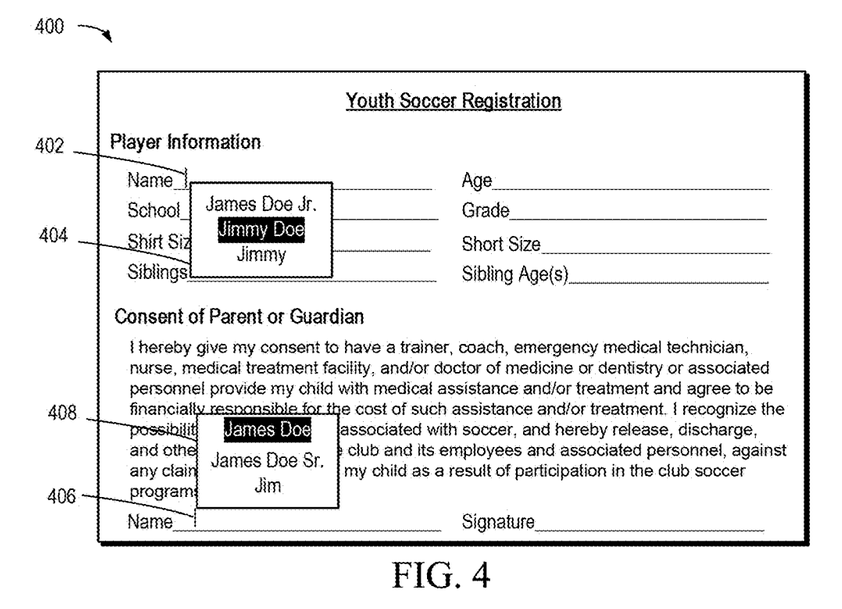
FIG. 4 illustrates an exemplary user interface displaying field content suggestions.

As used herein the term "context" refers to the purpose, circumstances, or perspective of a form or portion of a form. In some examples, the context of a form identifies the subject to which the form or portion of the form relates. For example, a tax form or IRS form has an IRS context. In some examples, the context of a form identifies the person, entity, or subject matter to which the form or portion of the form relates. For example, a form to register a child for an activity has a child context. In general, fields with the same labels (e.g., name, address, etc.) can be used in different contexts and have different meanings depending on the context, e.g., a "name" field has different meaning in a "self" context then it does in a "child" context, as illustrated in FIG. 4.

Figure 1:
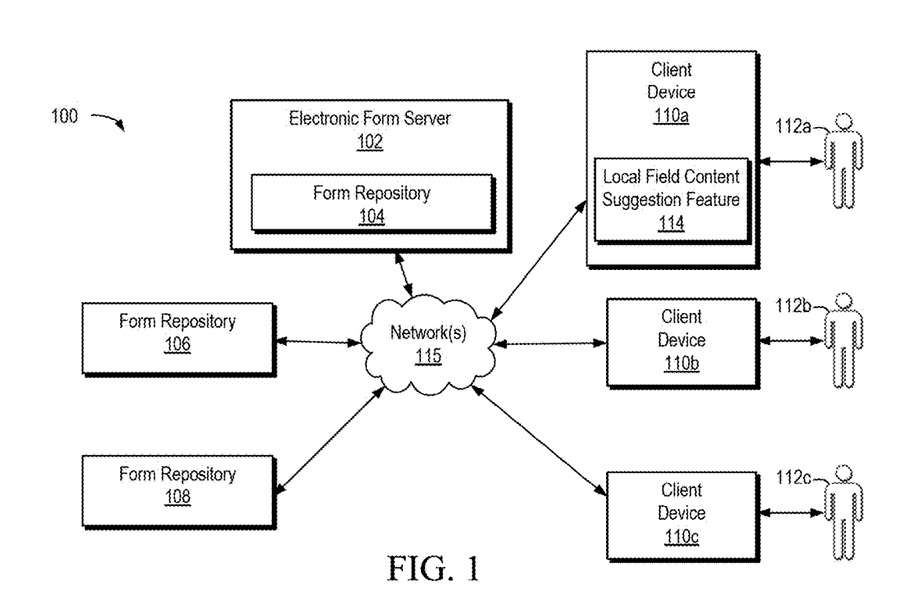
FIG. 1 is a block diagram depicting an example of a system for using form features for non-text field characteristics or field-specific text characteristics to provide form searching and categorization services using an electronic form search and categorization server.

Referring now to the drawings, FIG. 1 is a block diagram depicting an example of a system for using form features for non-text field characteristics or field-specific text characteristics to categorize forms into different contexts to provide field content suggestions using an electronic form server 102. Individuals 112a-c use client devices 110a-c to access the electronic forms through network 115. Forms can be provided from a repository of forms 104. In one example, client device 110a accesses electronic form server 102 and selects a particular form to be completed on client device 110a. The form is provided to and displayed on client device 110a. In one embodiment, field content suggestions are identified by electronic form server 102, provided as part of or separate from the form, and then displayed on the form on the client device 110a.

Field content suggestions can additionally or alternatively be provided locally on the client device 110a. For example, client device 110a, as illustrated, maintains its own local field content suggestion feature 114. Such a local field content suggestion feature 114 can be a part of a standalone application for accessing, displaying, and completing forms, part of a downloaded webpage used to access, display, and complete forms, or part of any other type of functionality.

The field content suggestion functionality provided by the electronic form server 102 or local field content suggestion feature 114 uses one or more contexts associated with a form or portion of a form and, in one embodiment, an identity of a person or entity completing the form, to identify field content suggestions. In one example, a form has metadata associating a first part of the form with a "self" context and a second part of the form with a "spouse" context. The field content suggestion functionality in this example identifies "John" as a suggestion for a name field in the first part of the form and identifies "Jane" as a suggestion for a name field in the second part of the form.

A form categorizing feature is also provided by the electronic form server 102. The form categorization feature can be used to categorize an uncategorized form, portion of a form, or collection of forms if, for example, forms in a repositories 104, 106, or 108 have not been categorized, or can be used to categorize new forms that are added to a repository 104, 106, 108.

Figure 2:
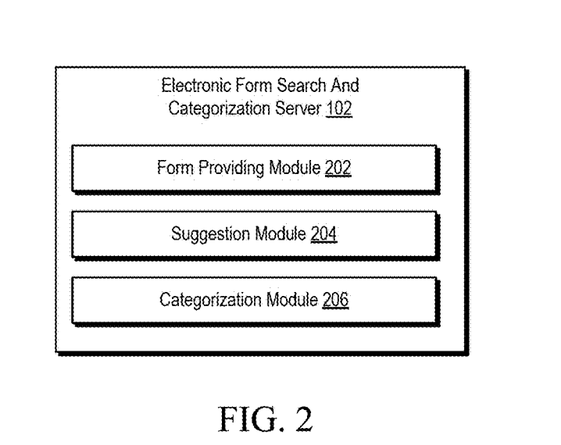
FIG. 2 is a block diagram illustrating exemplary modules for implementing functions in electronic form categorization and search server FIG. 1.

FIG. 2 is a block diagram illustrating exemplary modules for implementing functions in electronic form server 102 of FIG. 1. Similar modules could additionally or alternatively be used in feature 114 of FIG. 1. The electronic form server 102 includes modules 202, 204, and 206, which each are implemented by a processor executing stored computer instructions. The form providing module 202 receives and responds to requests for forms by identifying the forms in a repository and providing the forms. Suggestion module 204 provides field content suggestions. In one embodiment, a user's identity is identified when a form is requested and suggestion module 204 uses the user's identity to provide field content selections for one or more fields in the form. Form providing module 202 then provides the form, including the field content suggestions, to the user.

Categorization module 206 performs categorization of forms into contexts based on features for non-text field characteristics or field-specific text characteristics. In one example, this involves categorizing new forms added to form repository 104 as the forms are added to the repository. Form categorization involves identifying form features of forms and categorizing the forms based on the features. Using form features for non-text field characteristics or field-specific text characteristics provides particular advantages. For example, the location of a field on a page (located by scanning or already known based on the form's metadata), the locations of some or all of the fields with respect to each other (i.e., the field layout), the information type of those fields, and other field characteristics can alone or in combination with one another, form a feature set or feature vector for the form that can be compared with the feature set or feature vector of other forms (or of a particular category) to categorize the forms.

Form categorization using form features for non-text field characteristics or field-specific text characteristics can be initiated and implemented in various ways. In one embodiment, a form context is represented by one or more example representative forms. The representative font's can be manually identified and then other forms are included in the context if their feature sets are sufficiently similar to those of one of the representative forms. As a specific example, forms sharing at least 5 features with a context representative form are included in the category for that context. Similarly, form categorization can use a form space in which forms similarity is assessed. A categorization process can find all forms that are within a threshold distance of a representative form in field space, where the distance represents similarity of the form features for field characteristics.

Similar techniques can be applied to particular portions of a form. Such portions of the form can be identified based on explicit information about the form identifying individual sections or inferred from characteristics of form, such as section breaks, page breaks, headings, dividing lines, etc.

In one embodiment, a category for a context is defined by a set of features. Such features can be manually identified for each context. For example, a category for a "self" context may be defined by certain indicative form features. In one embodiment, these features are weighted and used to assess whether a given form is in the context. The more features a given form has and the more highly-weighted those features are, the more likely the form will be categorized within the context. A greater correlation of features corresponds to a greater degree of belongingness. Note that non-text field characteristics can be used alone as features or non-text field characteristics can be used together with text-based field characteristics to provide the form features.

By categorizing forms into different contexts using features for non-text field characteristics or field-specific text characteristics, forms are categorized more accurately and more quickly. Better categorization of forms significantly improves the experience of a person completing a form using field content suggestions based on context. The improved field content suggestions also enable completing forms on phones, tablets, and other small devices, which have less space to display field content suggestions than full screen monitor devices. Because the field content suggestions are more likely to be relevant, less time-consuming and frustrating navigation through field content suggestions on the smaller device will be required.

Figure 3:
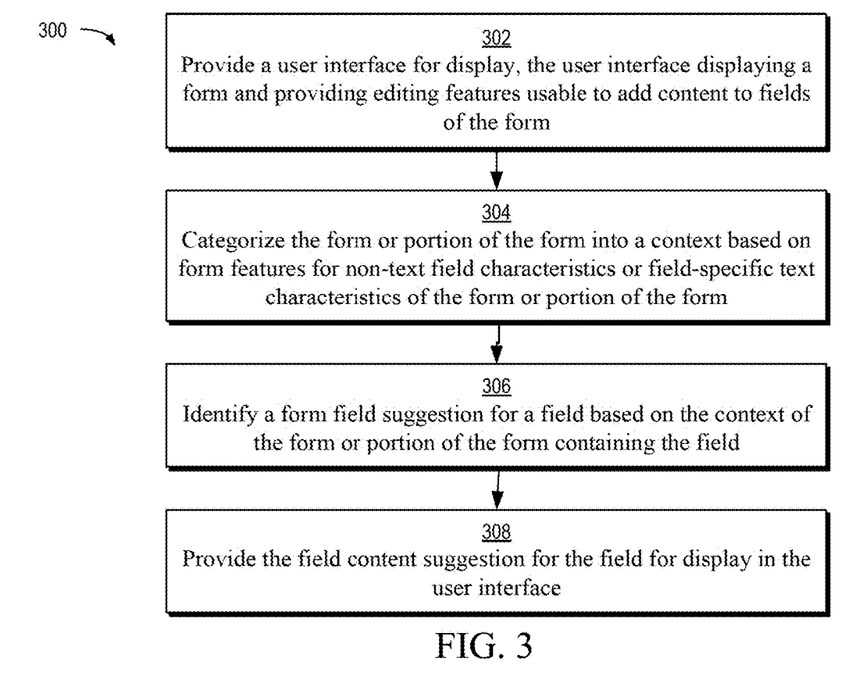
FIG. 3 is a flow chart of an exemplary method for facilitating adding content to a form by providing field content suggestions using context determined based on form features.

FIG. 3 is a flow chart of an exemplary method 300 for facilitating adding content to a form by providing field content suggestions using context determined based on form features. Method 300 can be performed by electronic form server 102 of FIG. 1, using a local field content suggestion feature, such as feature 114 of FIG. 1, or using any other suitable device.

Method 300 involves providing a user interface for display, the user interface displaying a form and providing editing features usable to add content to fields of the form, as shown in block 302. In one embodiment, the user interface is provided as a web page received from a server and displayed on a client device. In another embodiment, the user interface is an interface of a stand-alone application. The user interface, in one embodiment, displays the form. Titles and labels of the form are displayed and the user interface restricts editing of the form to editing (e.g., adding, changing, deleting) the content of fields of the form.

Method 300 further involves categorizing the form or portion of the form into a context based on form features for non-text field characteristics or field-specific text characteristics of the form or portion of the form, as shown in block 304. In one embodiment, categorizing the form or portion of the form into a context involves determining a feature vector of a plurality of form features of the form or portion of the form. Categorizing the form is then based on the feature vector. In one embodiment, a feature vector is defined by several normalized measurements including, but not limited to, the average font size of field labels, average height of form fields, average vertical spacing between vertically stacked form fields, and percentage of form fields contained within a table.

In one embodiment, categorizing the form or portion of the form into the context involves identifying a plurality of portions in the form and associating a respective context with different portions of the plurality of portions based on form features within each of the respective different portions. In one example, a first portion of the form is categorized in the "self" context, e.g., related to the person filling out the form, a second portion of the form is categorized in the "spouse" context, e.g., related to the spouse of the person filling out the form, and a third portion of the form is related to a "dependents" or "children" portion of the form related to the dependents or children of the person filling out the form. In one embodiment, identifying and categorizing individual form portions involves assessing vertical and horizontal separators, which may include either lines or substantial white space areas on the form. More specifically, the system identifies spacing between fields to look for patterns indicative of a section break. Similarly, the system identifies field characteristic to look for indicia of the beginning of new sections, e.g., emphasized text that is bold, capitalized, larger than other text, etc. Such information can be identified in a preprocessing step or as part of the context determination.

In one embodiment, categorizing the form or portion of the form into the context comprises creating a training model using a collection of forms or portions of forms for which context is user-inputted or automatically determined and applying the training model to the form to identify the context.

Method 300 further involves identifying a form field suggestion for a field based on the context of the form or portion of the form containing the field, as shown in block 306. The form field suggestions can be generic or user specific. For example, based on determining that a "degree" field is in an "employment form" context, the system determines to provide standard options such as "High School," "BA," "BS," "MA," "MS," "PhD," "J.D.", etc. In contrast, based on determining that a context of a form is "employment form," field content suggestions for a "name" field are customized based on the identity of the user. The identity is determined in various ways. In one example, identity is determined based on the user logging into an account to use the form editing software. In another example, the software tracks information entered by the user in forms over time for use on subsequent forms. In the "name" field example, as one example, the system may have identified that the user fills in "Thomas" on "name" fields in "employment form" and other more formal contexts and fills in "Tom" in "social form" and other less formal contexts. Accordingly, in this example the system identifies that the context of the form is an "employment form" context and, based on this and the information known about the user, provides "Thomas" as a field content suggestion.

Method 300 also involves providing the field content suggestion for the field for display in the user interface, as shown in block 308.

FIG. 4 illustrates an exemplary user interface 400 displaying field content suggestions. In this example, in response to the user positioning the cursor to enter text in the "Name" field 402 in the "Player Information" section of the form, the user interface displays field content suggestions 404 of "James Doe Jr.," "Jimmy Doe," and "Jimmy." These suggestions are based on determining that the "Player Information" section of the form is categorized into the "child" context.

The determination of this "child context," in this example, involves first identifying the different sections of the document and then determining a context specific to one or more of the sections. In this embodiment, identifying that there are different sections is based on recognizing horizontal whitespaces prior to text and the larger emphasized font of the text following such whitespaces. Additional or alternative patterns and form field characteristics can be used to identify that a form has multiple sections and where those sections are located. The particular context of each section is next determined.

Determining the context of section can be based on the form non-text field characteristics or field-specific text characteristics within the section and/or based on comparison with other sections of the form. Based on the identification of sections of the form, the system, in one embodiment, examines (and compares) the fields near the beginning of each respective section to identify context. In the example of FIG. 4, the system identifies that "Youth" appears at the top of the form to identify a child context and confirms this based on the subsequent "Parent or Guardian" label near the beginning of a subsequent section. The fields (e.g., spacing, size, text labels, etc.), within each section are also used to identify and confirm context in certain embodiments.

Based on the determined context, the system selects field content selections that the user has entered into previously completed forms (or portions thereof) having the "child" context. In this example, the father "James Doe Sr." is the user completing the form (and prior forms) and previously added information about his son using the names "James Doe Jr.," "Jimmy Doe," and "Jimmy" in "name" fields" in "child" context forms or portions of forms. The frequency with which such names were used in the past can be used to select which names to suggest, e.g., selecting only the top three most frequently used values. Similarly, the frequency with which such names were used in the past can be used to rank and order the suggestions for display, e.g., displaying the most frequently used value at the top, followed by the second most frequently used value, etc.

The example of FIG. 4 further illustrates field content suggestions 408 provided when the cursor is moved to the "name" field 406 in the "Consent of Parent or Guardian" section of the form. In this case, these suggestions are based on determining that the "Consent of Parent or Guardian" section of the form is categorized into the "self" context. Based on this context, the system selects field content selections ("James Doe," "James Doe Jr.," and "Jim") that the user has entered into previously completed forms (or portions thereof) having the "self" context.

Thus, in the example of FIG. 4, a form field suggestion of a field in a first portion of the form is identified based on the context of the first portion being associated with an identity of a user adding content to the form and another form field suggestion of another field in a second portion of the form is identified based on a second context of the second portion being associated with an identity other than the identity of the user adding content to the form.

In one embodiment, the user's selections of field content suggestions and entering of text is tracked on an ongoing basis. In one example, which context is associated with the form or portion of the form is modified based on content added to the field. In the above example, the system may recognize that the user entered his own name rather than his son's name in a portion of a form previously considered to have a child context. Based on recognizing the inconsistency, the system can change the context associated with the section, for example to change the context from "child" to "self," or by adding the "self" so that suggestions related to both the "child" context and "self" context are provided for fields in the form or portion thereof. In one embodiment, suggestions are provided based on a single identified context. In another embodiment, multiple contexts are used. In this example, a machine learning model identifies a plurality of context candidates and provides continuous outputs reflecting confidence of each context for a form or portion thereof. Multiple contexts are selected for the form or portion of the form when those multiple contexts have confidence scores above a certain confidence threshold.

Figure 5:
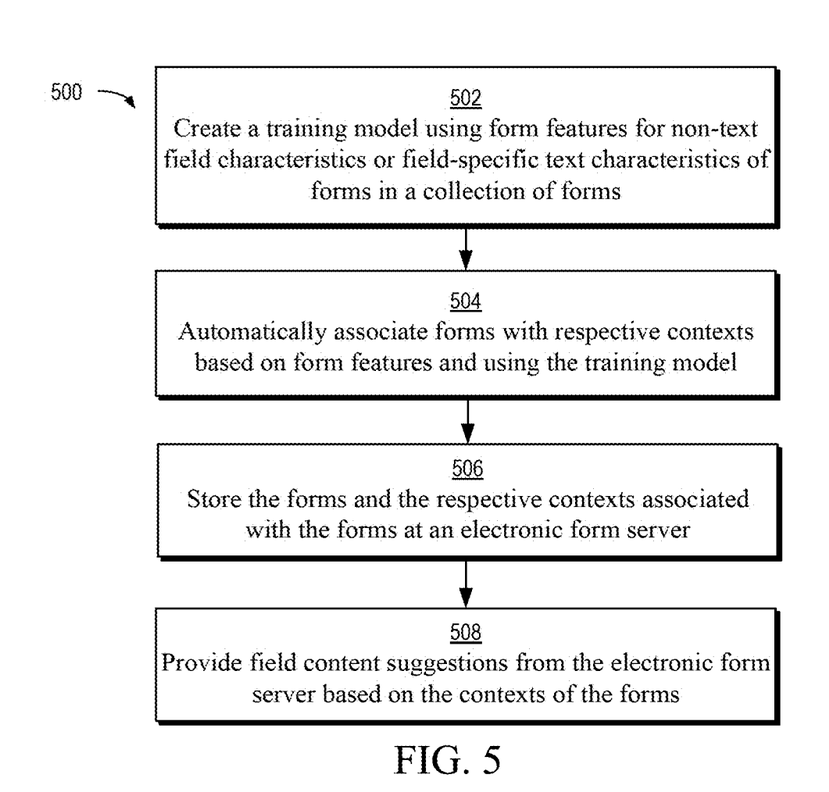
FIG. 5 is a flow chart of another exemplary method for facilitating field content suggestions by associating forms with contexts using a training model.

FIG. 5 is a flow chart of another exemplary method 500 for facilitating field content suggestions by associating forms with contexts using a training model. Method 500 can be performed by electronic form categorization and search server 102 of FIG. 1 or any other suitable device.

Method 500 involves creating a training model using form features for non-text field characteristics or field-specific text characteristics of forms in a collection of forms, as shown in block 502. The training model represents the significance (e.g., via coefficients used in a model) of each of the form features to each of the contexts. In one embodiment, creating the training model involves using a collection of pre-categorized forms. For example, user input may identify contexts for forms in a collection of forms. Features can be extracted from these forms and used as indicators of the forms. In one embodiment, individual contexts are associated with particular feature vectors that identify features that forms in the context likely have. Such a feature vector may assign weights to the features of the vector.

Any appropriate algorithm can be used to develop a training model. Such algorithms can be used to construct unigram/bigram models for individual form contexts. In cases of supervised data, exemplary classification algorithms include, but are not limited to those involving naive Bayes, support vector machine (SVM), decision tree, logistic regression, K-nearest neighbor (KNN), neural networks, latent semantic analysis, Rocchio's algorithm, fuzzy correlation and genetic algorithms, boosting algorithms-AdaBoost, and random forest.

Certain embodiments use user input to initiate categorization of forms. For example, input can be received to identify a number of contexts, to identify particular contexts and/or features for such contexts, and/or user input categorizing a sample set of forms. For example, one embodiment involves receiving user input categorizing forms in a collection into contexts, creating a training model using the collection of categorized forms, and applying the training model to uncategorized forms to categorize the uncategorized forms in the respective contexts based on the form features for the non-text field characteristics or field-specific text characteristics of the forms.

In other embodiments, creating a training model is unsupervised and based on distances between form-specific features of the forms. In one embodiment, creating the training model comprises using the machine learning algorithm on uncategorized forms in the collection of forms, the training model using coefficients representing belongingness to individual contexts of a number of contexts. The number of contexts may be predetermined or adaptive. For example, if a predetermined number of contexts is used as a starting point and an analysis determines that combining two of the contexts leads to a superior result, the system can adaptively adjust the number of contexts to best fit the data. In another example, a predetermined number of contexts is used and then users are optionally permitted to add new contexts to provide user-specific custom contexts. In such scenarios, the system can adaptively adjust to include the new contexts. In one embodiment, the model is retrained for that particular user to include the new contexts. This allows for supervised retraining of the model. The model is thus customized for each user based on the user-specific custom contexts. In one example, a section within a form is noted to be separate from the main form, the user enters some data from a custom context, the application adjusts to realize that section belongs to the custom context, and further answers are modified on-the-fly to reflect altered rankings reflecting the custom category. Thus, the system need not be trained to specifically recognize the custom area in the beginning; it can be recognized at a later time or merely noted as not fitting known contexts.

After creating a training model, method 500 involves automatically associating forms with respective contexts based on form features and using the training model, as shown in block 504. For a given form to be associated with a context, i.e., categorized, the form's field characteristics are examined and used as input to the training model to identify one or more appropriate contexts.

Method 500 further involves storing the forms and the respective contexts associated with the forms at an electronic form server, as shown in block 506. In one example, forms are stored with tags identifying associated contexts, best matching contexts, context rankings, context significance, metadata indicating context associations, etc. The stored information can additionally or alternatively represent feature vector scores. In one embodiment, storing the forms and the respective contexts associated with the forms involves storing an indication of significance of a context to a form or portion thereof, e.g., context A is the form's primary context and contexts B and C are secondary contexts, relative to the primary context, with tertiary [single-line] contexts of D and E, relative to the secondary contexts. Another embodiment simply stores the feature vector values and then performs ranking based on the feature vector and the actual context store is a post-processing step.

Method 500 further involves providing field content suggestions from the electronic form server, as shown in block 508. Such field context suggestions, for example, can be displayed as suggestions in a list when a user initiates adding content in a field, e.g., by selecting the field or beginning to enter text into the field.

Figure 6:
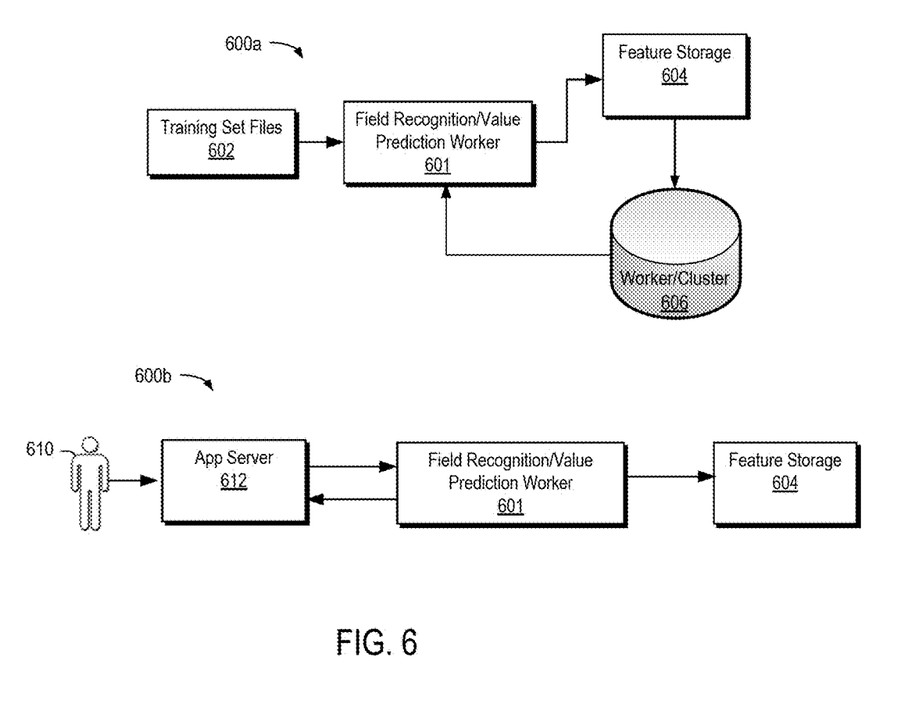
FIG. 6 is a flow chart illustrating an exemplary technique for associating a form or portion of a form with a category.

FIG. 6 illustrates flow charts illustrating an exemplary training phase 600a and runtime phase 600b. In the training phase 600a, feature extraction is performed by field recognition/value prediction worker 601 using a training set of files 602. The training set of files includes a plurality of forms from a variety of different categories, although the forms are not necessarily already determined to be associated with such categories. The field recognition/value prediction worker 600 identifies features of the forms and provides the features for storage in feature storage 604. In one example, the forms are examined using image recognition software that recognizes fields based on characteristics of the graphics in the forms. In another embodiment, fields are identified based on metadata associated with the form. Other embodiments use these techniques in combination with one another or using alternative or additional techniques to identify fields in the forms.

The field recognition/value prediction worker 601 can extract various features. The following exemplary form features have been found useful in predicting categories of forms. The number of fields in the form and spacing between the fields are useful features. Extracting such information can help distinguish complex and simple forms from one another. The font size distributions of field labels and the font sizes used for the text in different lines are also useful features. For example, complex forms may have tiny fonts and simpler forms may have large fonts. Other useful features include the title of the form, bold text in the form, field decorations, text inside page margins, types of field and label representations (e.g., use of comb fields, with either a closed or open top border; the use of tables, either lined or white space; single underlines with labels underneath; single underlines with labels to the left; boxes with the labels inside), and logos/names present at the top of form, among others.

The data from the feature storage 604 is provided to worker/cluster 606, for example, in a weekly or biweekly export of the data for training purposes. The worker/cluster analyzes the feature data and provides weights to the field recognition/value prediction worker 601 based on the training data. For example, the weights can represent the relative significance of one or more features to a particular context.

Field recognition/value prediction worker 601 also responds to requests to categorize new forms. In the runtime phase 600b, user 610 uploads a form to application server 612. Application server 612 sends the form to the field recognition/value prediction worker 601. The field recognition/value prediction worker 601 examines the features of the uploaded form and the features for the potential categories and determines one or more potential categories for the uploaded form. The field recognition/value prediction worker 601 uses the context of the form for predicting and providing suggested values for the form fields.

In one embodiment, a user feedback mechanism allows the user to approve system-identified categories for the form or associate a new context to the form. If a feedback mechanism is used, the initial feature extraction and subsequent user assignments may be hashed to provide greater security. In one embodiment, the field recognition/value prediction worker 601 performs feature extraction and determines a confidence value that the feature is representative of a particular context. In this example, if the field recognition/value prediction worker sends the context back with a predetermined confidence cutoff (e.g., 95% or greater), then the features are hashed and are added to the feature storage for the context. Essentially once the feature vector of the form is matched to a context, then that form can be used to grow the feature storage as if it had been a training file. In this way, the criteria are determined and/or refined for determining whether a given form should be categorized in a particular context or not.

Figure 7:
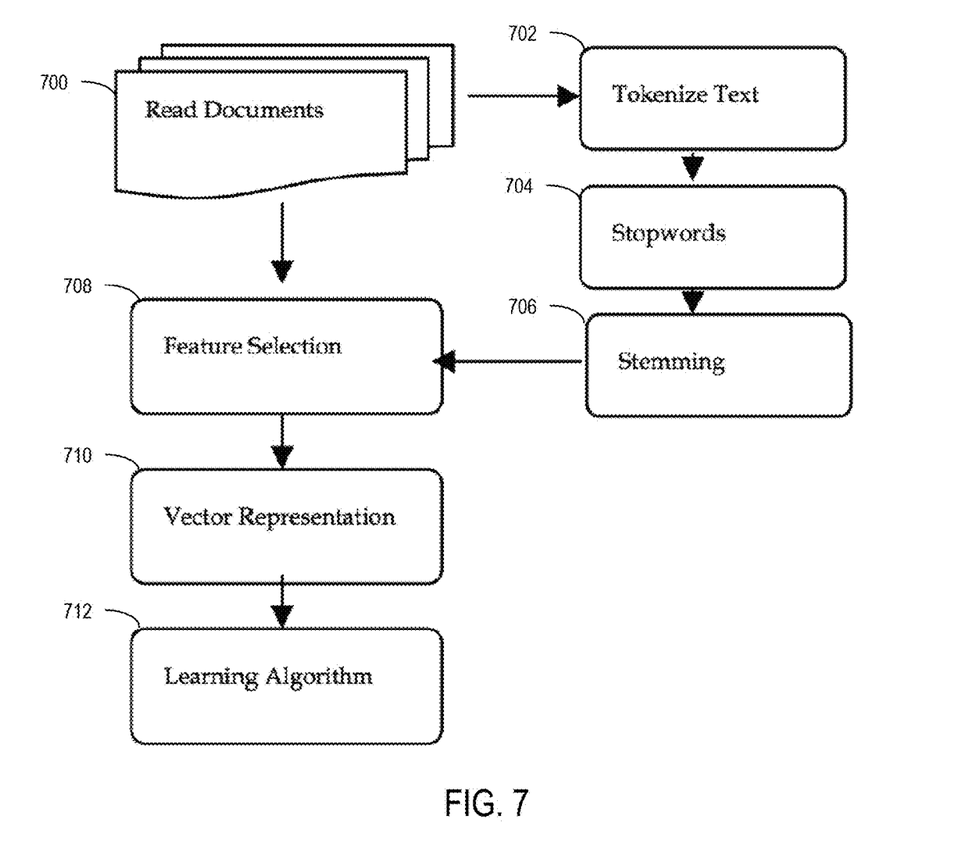
FIG. 7 illustrates a flow chart of an exemplary form categorization process.
Figure 8:
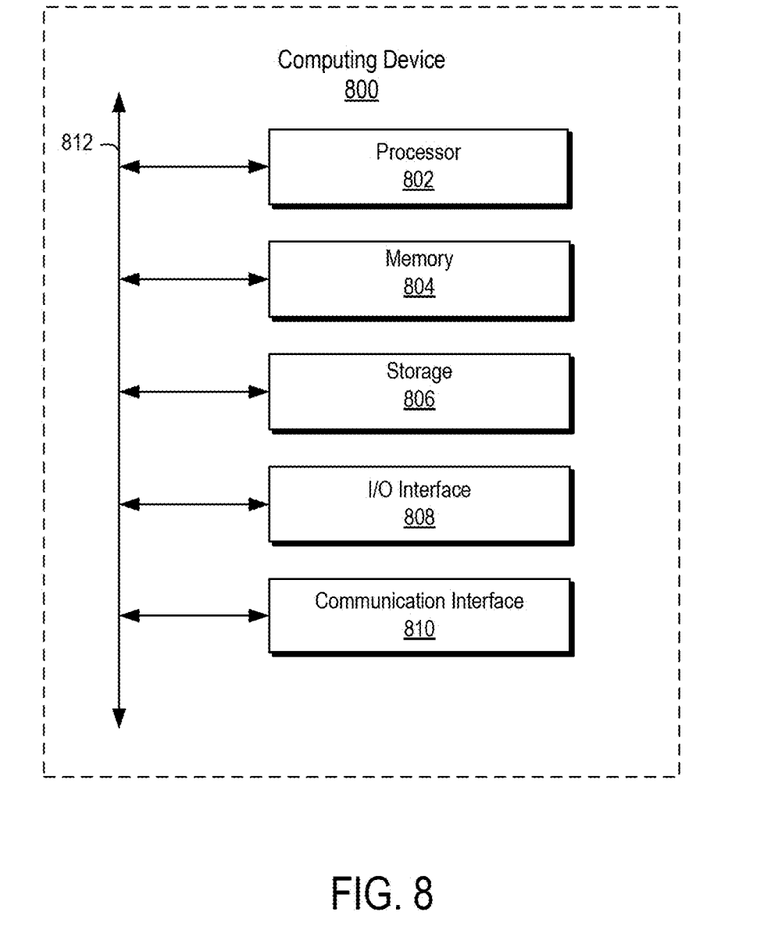
FIG. 8 is a block diagram depicting example hardware implementations for the components described in FIG. 1.

FIG. 7 illustrates a flow chart of an exemplary form categorization process. In this example, the process reads the forms at step 700. Forms can be collected in any appropriate manner. In one example a small collection of forms (e.g., 50-100) are collected for identified form categories. In one specific, example such forms are collected using a simple crawler program which would fetch PDFs and other images provided as results for particular keywords. This might involve, for example, extracting the first 100 health related PDFs/images from a web search result for keywords such as "health forms PDF" of "health form images." In addition or alternatively, forms can be manually compiled by manually fetching forms from well-known health-related sites such as the forms from well-known health insurance companies for health forms or from the IRS website for tax forms.

After reading the form, the process of FIG. 7 tokenizes text at step 702, removes stopwords at step 704, performs stemming at step 706, and then performs feature selection at step 708. After selecting the features, vector representations are determined at step 710, and a learning algorithm is developed at step 712. In one example, after extracting required features from the form, these features are represented as a vector in n-dimensional space and referred to as the feature vector. The feature vector is an n-dimensional vector of numerical features that represent an object's important characteristics. For example when representing a form, the feature values might correspond to, but not be limited to, the average font size of field labels, average height of form fields, average vertical spacing between vertically stacked form fields, etc. The values of these features can be absolute measures or Boolean measures. Absolute measures include, for example, feature1: average font size of field labels is x mm and feature2: average height of form fields is y mm, feature3: average vertical spacing is z mm. Note: x, y, z are numeric variables and that mm represents millimeters. These measurements are normalized and will lie in the range 0 to 1. If the normalized values are a, b and c respectively, then the vector representation of this form would be [a b c].

Boolean measures for the features can be categorized values, which fit many values, for example, feature1: all font size in a range 1-50, feature2: all font size in a range 50-100, feature3: height of range 50-100, Feature4: height of range 50-100 and so on. The output value is 1 if it lies in the range or 0 if it does not. The vector representation of a form with average font size: 25, height: 65 is represented as [1 0 1 0] where the first position corresponds to feature1, second to feature 2 and so on. These vector representations can get complex as more features and weights are added to the features.

Once the forms are represented as feature vectors, the feature vector is input into the learning algorithm, e.g., a linear classifier algorithm. For a two-class classification problem, the operation of a linear classifier can be visualized as splitting a high-dimensional input space with a hyperplane so that all points on one side of the hyperplane are classified as "yes", while the others are classified as "no".

While the techniques for classifying forms described herein have primarily been discussed in the context of use to facilitate field content suggestions, many other uses are envisioned. Automatic and accurate form categorization of forms into contexts can also be used to facilitate form interpretation, automatic tagging, and other functions performed on forms that can be tailored for the particular type of form.

Exemplary Computing Environment

Any suitable computing system or group of computing systems can be used to implement the computer devices of FIG. 1 or otherwise used to implement the techniques and methods disclosed herein. For example, FIG. 7 is a block diagram depicting examples of implementations of such components. The computing device 700 can include a processor 702 that is communicatively coupled to a memory 704 and that executes computer-executable program code and/or accesses information stored in the memory 704 or storage 706. The processor 702 may comprise a microprocessor, an application-specific integrated circuit ("ASIC"), a state machine, or other processing device. The processor 702 can include one processing device or more than one processing device. Such a processor can include or may be in communication with a computer-readable medium storing instructions that, when executed by the processor 702, cause the processor to perform the operations described herein.

The memory 704 and storage 706 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 700 may also comprise a number of external or internal devices such as input or output devices. For example, the computing device is shown with an input/output ("I/O") interface 708 that can receive input from input devices or provide output to output devices. A communication interface 710 may also be included in the computing device 700 and can include any device or group of devices suitable for establishing a wired or wireless data connection to one or more data networks. Non-limiting examples of the communication interface 710 include an Ethernet network adapter, a modem, and/or the like. The computing device 700 can transmit messages as electronic or optical signals via the communication interface 710. A bus 712 can also be included to communicatively couple one or more components of the computing device 700.

The computing device 700 can execute program code that configures the processor 702 to perform one or more of the operations described above. The program code can include one or more of the modules of FIG. 2. The program code may be resident in the memory 704, storage 706, or any suitable computer-readable medium and may be executed by the processor 702 or any other suitable processor. In some embodiments, modules can be resident in the memory 704. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. In a computing environment, a method for facilitating adding content to forms by providing field content suggestions using context determined based on form features, the method comprising:
    defining a plurality of form contexts, wherein the form contexts comprise a unique purpose, a circumstance, or a perspective of a representative form, and wherein each of the form contexts is defined by assigning to it a plurality of representative form features and by assigning a weighting to each of the representative form features, wherein the representative form features comprise non-text field characteristics, field labels, and other field-specific text characteristics;
    providing a user interface for display, the user interface displaying a form and providing editing features usable to add content to fillable fields of the form, each of the fillable fields identified by a field label;
    determining, by a processor, which of the plurality of form contexts to assign to a portion of the form by identifying form features found in the portion of the form, correlating the identified form features to the representative form features of each of the form contexts, and assigning to the portion of the form the form context having a highest degree of correlation, wherein the portion of the form comprises a plurality of the fillable fields of the form;

identifying, by the processor and from the form context of the portion of the form, a field content suggestion for a fillable field within the portion of the form, the field content suggestion indicating content items selectable by a user to complete the fillable field; and providing, by the processor, the field content suggestion for the fillable field for display in the user interface.

2. The method of claim 1, wherein determining which of the plurality of form contexts to assign to the portion of the form comprises:

identifying a plurality of portions of the form; and
identifying a respective form context for different portions of the plurality of portions based on the form features within each of the respective different portions.

3. The method of claim 1, further comprising:
using the plurality of form contexts to categorize a collection of forms; creating a training model using the categorized collection of forms; and
wherein determining which of the plurality of form contexts to assign to the portion of the form is performed by applying the training model to the portion of the form.

4. The method of claim 1, further comprising:
creating a machine learning model for categorizing forms into the plurality of form contexts, the machine learning model trained using a collection of uncategorized forms; and
wherein determining which of the plurality of form contexts to assign to the portion of the form is performed by applying the machine learning model to the portion of the form.

5. The method of claim 1, wherein the weighting assigned to each of the representative form features of each of the plurality of form contexts is represented as a representative feature vector, and wherein identifying the context of the portion of the form comprises:

determining a feature vector representing the identified form features found in the portion of the form; and
comparing the feature vector of the portion of the form to each representative feature vector.

6. The method of claim 1, further comprising tagging the portion of the form with the identified form context of the portion of the form.

7. The method of claim 1 wherein assigning the weighting to each of the representative form features comprises assigning a relative significance of each of the representative form features likely to be found in each of the plurality of form contexts.

8. The method of claim 1, further comprising determining, by the processor, a new form context to assign to the portion of the form based on content added to the fillable field.

9. The method of claim 1, wherein the field content suggestion is identified based on form context of the portion of the field being associated with an identity of a user adding content to the form.

10. The method of claim 1, wherein:
the field content suggestion for the fillable field within the portion of the form is identified based on the form context of the portion of the form being associated with an identity of a user adding content to the form; and
another field content suggestion for another fillable field in a second portion of the form is identified based on a second context of the second portion of the form being associated with an identity other than the identity of the user adding content to the form.

11. The method of claim 1, wherein determining which of the plurality of form contexts to assign to of the portion of the form further comprises comparing the identified form features found in the portion of the form with form features found in another portion of the form different from the portion of the form.

12. In a computer network environment, a method for facilitating field content suggestions by associating forms with contexts using a training model, the method comprising:

defining a plurality of form contexts, wherein the form contexts comprise a unique purpose, a circumstance, or a perspective of a representative form, and wherein each of the form contexts is defined by assigning to it a plurality of representative form features and by assigning a weighting to each of the representative form features, wherein the representative form features comprise non-text field characteristics, field labels, and other field-specific text characteristics;

creating a training model for associating forms with respective form contexts, the training model trained using a collection of training forms;

applying, by a processor of a computing device, the training model to a form to determine which of the plurality of form contexts to assign to a portion of the form wherein the training model identifies form features found in the portion of the form, correlates the identified form features to the representative form features of each of the form contexts, and assigns to the portion of the form the form context having a highest degree of correlation, and wherein the portion of the form comprises a plurality of fillable fields of the form; and identifying, by the processor and from the form context of the form, a field content suggestion for a fillable field within the form, the field content suggestion indicating content items selectable by a user to complete the fillable field.

13. The method of claim 12, wherein the training model determines a relative significance of each of the representative form features likely to be found in each of the plurality of form contexts.

14. The method of claim 12, wherein the collection of training forms is a collection of uncategorized forms, and wherein the training model using coefficients representing belongingness to each of the plurality of form contexts.

15. The method of claim 12, wherein the collection of training forms comprises collection of categorized forms.

16. The method of claim 12 further comprising tagging the form with the identified form context.

17. A system comprising:
a processing device; and
a memory device communicatively coupled to the processing device,
wherein the processing device is configured to execute instructions included in the memory device to perform operations comprising:
receiving input defining a plurality of form contexts, wherein the form contexts comprise a unique purpose, a circumstance, or a perspective of a representative form, and wherein each of the form contexts is defined by assigning to it a plurality of representative form features and by assigning a weighting to each of the representative form features, wherein the representative form features comprise non-text field characteristics, field labels, and other field-specific text characteristics;

providing a user interface for display, the user interface displaying a form and providing editing features usable to add content to fillable fields of the form, each of the fillable fields identified by a field label;

determining which of the plurality of form contexts to assign to a portion of the form by identifying form features found in the portion of the form, correlating the identified form features to the representative form features of each of the form contexts, and assigning to the portion of the form the form context having a highest degree of correlation, wherein the portion of the form comprises a plurality of the fillable fields of the form;

identifying from the form context of the portion of the form, a field content suggestion for a fillable field within the portion of the form, the field content suggestion indicating content items selectable by a user to complete the fillable field; and providing the field content suggestion for the fillable field for display in the user interface.

18. The system of claim 17, wherein determining which of the plurality of form contexts to assign to the portion of the form comprises:

identifying a plurality of portions of the form; and identifying a respective form context for different portions of the plurality of portions based on the form features within each of the respective different portions.

19. The system of claim 17, further comprising:

using the plurality of form contexts to categorize a collection of forms;

creating a training model using the categorized collection of forms; and wherein determining which of the plurality of form contexts to assign to the portion of the form is performed by applying the training model to the portion of the form.

* * * * *